(12) United States Patent
Chen et al.

(10) Patent No.: US 9,130,241 B2
(45) Date of Patent: Sep. 8, 2015

(54) LITHIUM BATTERIES USING POLY(ETHYLENE OXIDE)-BASED NON-AQUEOUS ELECTROLYTES

(71) Applicant: UChicago Argonne, LLC, Chicago, IL (US)

(72) Inventors: Zonghai Chen, Bolingbrook, IL (US); Khalil Amine, Oak Brook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 39 days.

(21) Appl. No.: 13/912,390

(22) Filed: Jun. 7, 2013

(65) Prior Publication Data

US 2013/0273441 A1    Oct. 17, 2013

Related U.S. Application Data

(63) Continuation of application No. 12/146,020, filed on Jun. 25, 2008, now Pat. No. 8,475,688.

(60) Provisional application No. 60/973,976, filed on Sep. 20, 2007.

(51) Int. Cl.
| | |
|---|---|
| H01B 1/12 | (2006.01) |
| H01M 6/16 | (2006.01) |
| H01M 10/056 | (2010.01) |
| H01M 12/06 | (2006.01) |
| H01M 4/38 | (2006.01) |
| H01M 4/90 | (2006.01) |
| H01M 12/08 | (2006.01) |
| H01M 10/0525 | (2010.01) |
| H01M 10/0565 | (2010.01) |

(52) U.S. Cl.
CPC ............ *H01M 10/056* (2013.01); *H01M 4/382* (2013.01); *H01M 4/90* (2013.01); *H01M 12/06* (2013.01); *H01M 12/08* (2013.01); *H01M 10/0525* (2013.01); *H01M 10/0565* (2013.01); *H01M 2300/0025* (2013.01); *H01M 2300/0085* (2013.01); *Y02E 60/50* (2013.01); *Y02T 10/7011* (2013.01)

(58) Field of Classification Search
CPC ........ H01B 1/12; H01M 6/16; H01M 10/056; H01M 12/06
USPC ........... 252/519.34, 519.31, 519.33; 429/403, 429/337, 341
See application file for complete search history.

(56) References Cited

U.S. PATENT DOCUMENTS

| | | | |
|---|---|---|---|
| 5,487,959 A | 1/1996 | Koksbang | |
| 5,582,623 A * | 12/1996 | Chu | ............................. 29/623.1 |
| 5,731,106 A | 3/1998 | Tsutsumi et al. | |
| 5,849,432 A | 12/1998 | Angell et al. | |
| 6,045,952 A | 4/2000 | Kerr et al. | |
| 6,232,021 B1 | 5/2001 | Negoro | |
| 6,291,107 B1 | 9/2001 | Shimizu | |
| 6,387,571 B1 | 5/2002 | Lain et al. | |
| 6,506,516 B1 | 1/2003 | Wietelmann et al. | |
| 6,596,441 B1 * | 7/2003 | Green et al. | ................... 429/326 |
| 7,172,834 B1 | 2/2007 | Jow et al. | |
| 7,588,859 B1 | 9/2009 | Oh et al. | |
| 7,968,235 B2 | 6/2011 | Amine et al. | |
| 9,005,822 B2 * | 4/2015 | Zhang et al. | ................... 429/326 |
| 2001/0033964 A1 | 10/2001 | Heider et al. | |
| 2002/0039687 A1 | 4/2002 | Barker et al. | |
| 2003/0180624 A1 * | 9/2003 | Oh et al. | ........................ 429/313 |
| 2003/0180625 A1 * | 9/2003 | Oh et al. | ........................ 429/313 |
| 2004/0029017 A1 | 2/2004 | Besenhard et al. | |
| 2004/0131934 A1 | 7/2004 | Sugnaux et al. | |
| 2004/0214090 A1 | 10/2004 | West et al. | |
| 2005/0019667 A1 | 1/2005 | Oh et al. | |
| 2005/0170254 A1 | 8/2005 | West et al. | |
| 2005/0274000 A1 | 12/2005 | Oh et al. | |
| 2006/0035154 A1 | 2/2006 | West et al. | |
| 2007/0117007 A1 * | 5/2007 | Visco et al. | ................... 429/144 |

(Continued)

FOREIGN PATENT DOCUMENTS

JP          50-000095       1/1975
WO     WO 2012138844 A2 *  10/2012

OTHER PUBLICATIONS

U.S. Appl. No. 60/636,636, filed Dec. 16, 2004, Amine et al.

(Continued)

*Primary Examiner* — Douglas Mc Ginty
(74) *Attorney, Agent, or Firm* — Foley & Lardner LLP

(57) ABSTRACT

Lithium-air cells employing poly(ethyleneoxide) phosphate-based electrolytes may be prepared and exhibit improved charge carrying capacity. Such PEO phosphates generally have the formulas IIa, IIb, IIc, where:

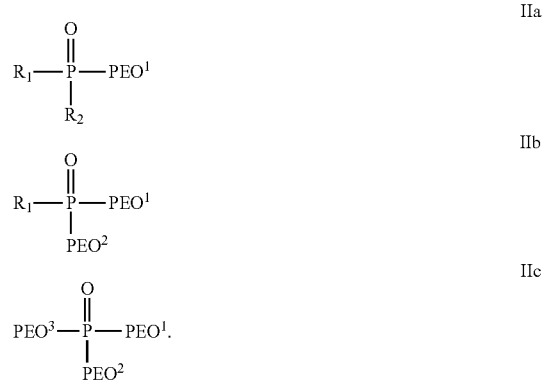

16 Claims, No Drawings

(56) References Cited

U.S. PATENT DOCUMENTS

2007/0221265 A1 9/2007 Affinito et al.
2008/0134492 A1 6/2008 Amine et al.
2008/0318136 A1* 12/2008 Amine et al. .............. 429/341

OTHER PUBLICATIONS

U.S. Appl. No. 60/647,361, filed Jan. 26, 2005, Amine et al.
Amine et al., "Novel silane compounds as electrolyte solvents for Li-ion batteries", Electrochemistry Communications 8 (2006) pp. 429-433.
Bruce et al., "Li-O2 and Li-S Batteries with High Energy Storage", Nature Materials, 2012, 22(1), pp. 19-29.
International Search Report and Written Opinion for PCT Application No. PCT/US06/08664, mailed Dec. 13, 2006.
Freunberger et al., "Reactions in the Rechargeable Lithium—O2 Battery with Alkyl Carbonate Electrolytes", Journal of the American Chemical Society, 2011, 133(20), pp. 8040-8047.
Komaba, S. et al., "2-Vinylpyridine as Film-forming Additve [sic] to Suppress the Degradation of Carbon Anode by Dissolved Manganese for E/LiMn2O4 Rechargable Battery," Chemistry Letters, 2002, No. 12, pp. 1236-1237; published by the Chemical Society of Japan.
Peng et al., "Oxygen Reactions in a Non-Aqueous Li Electrolyte", Agnew. Chem. Int. Ed., 2011, 50(28), pp. 6351-6355.
U.S. Non-Final Office Action for U.S. Appl. No. 12/146,020, dated Sep. 16, 2011.
U.S. Final Office Action for U.S. Appl. No. 12/146,020, dated Jul. 2, 2012.
U.S. Notice of Allowance for U.S. Appl. No. 12/146,020 dated Mar. 8, 2013.
Xu et al., "Reaction Mechanisms for the Limited Reversibility of Li-O2 Chemistry in Organic Carbonate Electrolytes", Journal of Power Sources, 2011, 196(22), pp. 9631-9639.
Zhang et al., "Increased Stability Toward Oxygen Reduction Products for Lithium-Air Batteries with Oligoether-Functionalized Silane Electrolytes", The Journal of Physical Chemistry, 2011, 115, pp. 25535-25542.

\* cited by examiner

LITHIUM BATTERIES USING POLY(ETHYLENE OXIDE)-BASED NON-AQUEOUS ELECTROLYTES

CROSS-REFERENCE TO RELATED APPLICATIONS

This application is a continuation of U.S. Non-Provisional patent application Ser. No. 12/146,020 filed Jun. 25, 2008, which issued as U.S. Pat. No. 8,475,688 on Jul. 2, 2013, and which claims the benefit of U.S. Provisional Patent Application No. 60/973,976, filed Sep. 20, 2007, the entire contents of which are incorporated herein by reference.

GOVERNMENT RIGHTS

The United States Government has rights in this invention pursuant to Contract No. DE-AC02-06CH11357 between the United States Government and UChicago Argonne, LLC, representing Argonne National Laboratory.

FIELD OF INVENTION

Generally, the present invention relates to non-aqueous electrolytes with low flammability and their use in electrochemical cells. Specifically, non-aqueous electrolytes are provided that are chemically and electrochemically stable in the presence of oxygen.

BACKGROUND

Compared to lithium-ion batteries, lithium-air batteries have extremely high energy density. As such, lithium-air batteries may be promising candidates for applications in plug-in hybrid electric vehicles (PHEV) and electric vehicles (EV), where performance and high energy density are desired. However, traditional solvents pose technical barriers to the production of lithium-air batteries as a suitable non-aqueous electrolyte that can conduct both lithium ions to a negative electrode and oxygen to the positive air electrode. For example, carbonate-based solvents are known for use in lithium batteries, however carbonates can be electrochemically oxidized at positive potentials versus the $Li^+/Li$ couple, in the absence of oxygen. For example, ethylene carbonate (EC) can be electrochemically oxidized at a potential of 4.8 V vs. $Li^+/Li$ in the absence of oxygen. In the presence of oxygen, the chemical and electrochemical oxidation of carbonates is more facile, occurring at potentials lower than 4.8 V vs. $Li^+/Li$. The high vapor pressure of some carbonates at room temperature introduces other issues with regard to the development of air breathing membranes, through which oxygen is supplied from the air to the positive electrodes.

A lithium-air cell typically has a lithium negative electrode and an air positive electrode. Oxygen gas, introduced into the battery through the air cathode, is essentially an unlimited cathode reactant source so that the capacity of the battery is limited by the Li anode. During discharge, when the cell delivers the energy stored to the external load, the external current flows from the positive electrode to the negative electrode. The lithium in the negative electrode loses an electron; and the lithium ion is transported to the positive electrode through the electrolyte sandwiched between the negative electrode and the positive electrode. Meanwhile, at the positive electrode, oxygen is absorbed from atmospheric air and is reduced. As a result of the discharge process, lithium is removed from the negative electrode and lithium oxide is then deposited on the positive electrode. During the charging process, lithium oxide in the positive electrode is decomposed, lithium is deposited back to the negative electrode, and the resulting oxygen is released to the air.

Compared to lithium-ion cells, the lithium-air cell does not require host materials, for insertion or de-insertion of the lithium, at both electrodes. It is the host materials in lithium-ion cells that limit the capacity density and energy density of the cell. For instance, lithium-transition metal oxides are generally used as the host materials in positive electrodes of lithium-ion batteries, and such metal oxides typically have a specific capacity of less than 280 mAh/g. Graphite is generally used in lithium-ion batteries as the negative electrode material. Mesocarbon microbeads (MCMB) are one such graphitic material, and can provide a theoretical capacity of about 372 mAh/g. During the discharge of a lithium-ion cell, lithium is removed from the lithiated negative electrode and is inserted into the lithium-transition metal oxide of the positive electrode. During charge, lithium is removed from the positive electrode material and is re-inserted into the negative electrode material.

As described above, lithium-air batteries are not based on the intercalation mechanism of lithium-ion batteries. The specific capacity of the lithium anode is about 3800 mAh/g, which is about 10 times of the capacity of MCMB used as the negative electrodes for lithium ion batteries. The positive electrode of the lithium-air batteries is basically a conductive porous media without the presence of the host materials for lithium; storing the critical and unlimited component of oxygen in air. Thus, to access the higher capacities of lithium-air cells, solvents that are stable in such cells are required.

SUMMARY

In one aspect, a lithium-air cell is provided including a negative electrode; an air positive electrode; and a non-aqueous electrolyte including a poly(ethyleneoxide) solvent and a lithium salt. In such embodiments, the poly(ethyleneoxide) solvent is a compound of Formula Ia, Ib, Ic, Id, IIa, IIb, IIc, or a mixture of any two or more such compounds:

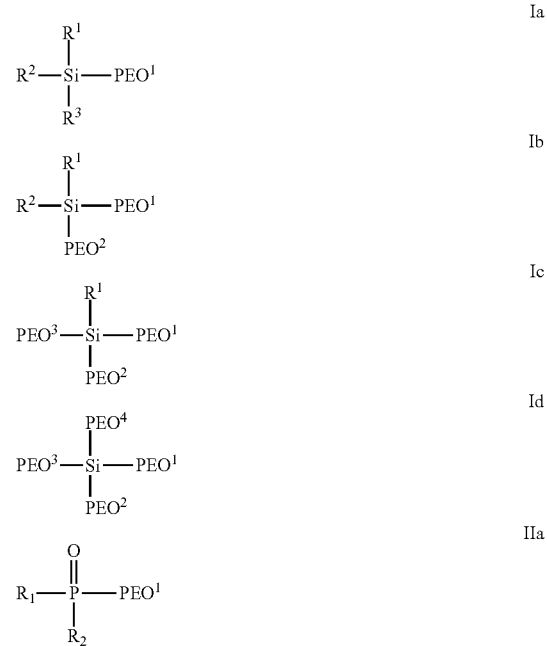

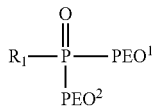
Ib

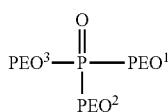
Ic $R^1$, $R^2$, and $R^3$ are independently H, a substituted or unsubstituted alkyl group having from 1 to 12 carbon atoms, a substituted or unsubstituted alkenyl group having from 2 to 12 carbon atoms, or a group of Formula IIIa, IIIb, IIIc, IIId, IVa, or IVb;

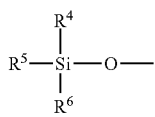
IIIa

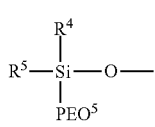
IIIb

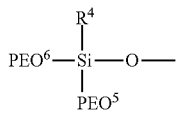
IIIc

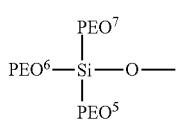
IIId

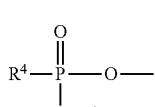
IVa

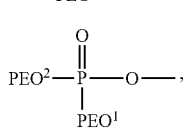
IVb $R^4$, $R^5$, and $R^6$ are independently H, a substituted or unsubstituted alkyl group having from 1 to 12 carbon atoms, or a substituted or unsubstituted alkenyl group having from 2 to 12 carbon atoms; and $PEO^1$, $PEO^2$, $PEO^3$, $PEO^4$, $PEO^5$, $PEO^6$, and $PEO^7$ are independently a poly(ethyleneoxide) group; with the proviso that when the poly(ethyleneoxide) siloxane is a compound of Formula Ia and $R^1$ is a group of Formula IIIa or IIIb, then at least one of $R^2$, $R^3$, $R^4$, $R^5$, and $R^6$ is other than alkyl.

In some embodiments, the poly(ethyleneoxide) solvent is a compound of Formula Ib, Ic, Id, or a mixture of any two or more such compounds.

In some embodiments, the electrolyte is not a gelled electrolyte. While in other embodiments, the electrolyte is a gelled electrolyte.

In some embodiments, $PEO^1$, $PEO^2$, $PEO^3$, and $PEO^4$, introduced above, are independently represented by Formula Va or Vb;

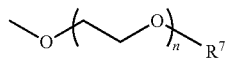
Va

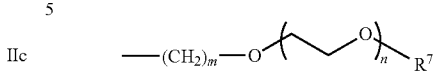
Vb where; $R^7$ is H, a substituted or unsubstituted alkyl group having from 1 to 12 carbon atoms, a substituted or unsubstituted alkenyl group having from 2 to 12 carbon atoms, or a group of Formula VI,

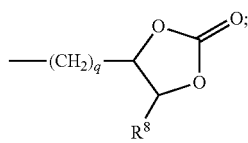
VI $R^8$ is H, a substituted or unsubstituted alkyl group having from 1 to 12 carbon atoms, or a substituted or unsubstituted alkenyl group having from 2 to 12 carbon atoms; m represents an integer from 1 to 8, n represents an integer from 0 to 20, and q represents an integer from 0 to 8.

In some embodiments, the poly(ethyleneoxide) solvent includes a compound of Formula IIa, IIb, IIc, or a mixture of any two or more such compounds; or a mixture of any two or more of the compounds of Formula IIa, IIb, or IIc, with any two or more of the compounds of Formula Ia, Ib, Ic, Id. In other embodiments, at least one of $R_1$, $R_2$, or $R_3$ is a group of Formula IIIa, IIIb, IIIc, or IIId.

In some embodiments, the lithium-air cell further includes a siloxanyl carbonate co-solvent. In such embodiments, the siloxanyl carbonate co-solvent is 1-[1-trimethylsiloxanyl-ethyl]ethylene carbonate.

In some embodiments of the lithium-air cell, the poly(ethyleneoxide) siloxane is 2-[2-[2-[2-methoxy]ethoxy]ethoxy] ethoxy trimethyl silane, 2-[2-[2-methoxy]ethoxy]-ethoxy trimethyl silane, or a mixture.

In some embodiments, the poly(ethyleneoxide) siloxane is present from about 5 wt % to about 95 wt %, where the wt % is based upon on the total weight of the poly(ethyleneoxide) siloxane, the salt, and the electrode stabilizing additive.

In some embodiments, the lithium salt of the lithium-air cell is electrochemically and chemically stable in the presence of oxygen. As used herein the terms electrochemically and chemically stable mean that the lithium salt does not oxidatively decompose or is at least resistant to degradation via oxidation. The concentration of the lithium salt may be from about 0.01 M to about 2.0 M.

In some embodiments, the lithium salt is $LiCF_3CO_2$, $LiC_2F_5CO_2$, $LiClO_4$, $LiBF_4$, $LiAsF_6$, $LiPF_6$, $LiPF_2(C_2O_4)_2$, $LiPF_4C_2O_4$, $LiCF_3SO_3$, $LiN(CF_3SO_2)_2$, $LiC(CF_3SO_2)_3$, $LiN(SO_2C_2F_5)_2$), lithium alkyl fluorophosphates, $Li(C_2O_4)_2$, $LiBF_2C_2O_4$, $Li_2B_{12}X_{12-p}H_p$, $Li_2B_{10}X_{10-y}H_y$, or mixtures of any two or more such materials; where X is OH, F, Cl, or Br, p is an integer from zero to twelve, and y is an integer from zero to ten.

In some embodiments, the lithium-air cell further includes an electrode stabilizing additive that can be oxidized or polymerized on the surface of a positive electrode, or can be reduced or polymerized on the surface of a negative electrode. In such embodiments, the stabilizing additive that can be reduced or polymerized on the surface of the negative electrode is selected from quinoline, vinyl quinoline, indole, vinyl indole, triethanolamine, imidazole, vinyl imidazole, pyrazine, vinyl pyrazine, isoquinoline, vinyl isoquinoline, quinoxaline, vinyl quinoxaline, biphenyl, 1,2-diphenyl ether, 1,2-diphenylethane, o-terphenyl, N-methylpyrrole, naphthalene, 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, and mixtures of any two or more such materials. In other embodiments, the electrode stabling additive is a compound of Formula VII:

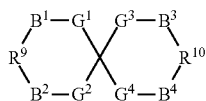

VII where $B^1$, $B^2$, $B^3$, and $B^4$ are independently O or $CR^{11}R^{12}$; provided that $B^1$ is not O when $G^1$ is O, $B^2$ is not O when $G^2$ is O, $B^3$ is not O when $G^3$ is O, and $B^4$ is not O when $G^4$ is O; $G^1$, $G^2$, $G^3$, and $G^4$ are independently O or $CR^{11}R^{12}$; provided that $G^1$ is not O when $B^1$ is O, $G^2$ is not O when $B^2$ is O, $G^3$ is not O when $B^3$ is O, and $G^4$ is not O when $B^4$ is O. In such embodiments, $R^9$ and $R^{10}$ are independently a substituted or unsubstituted divalent alkenyl or alkynyl group, and $R^{11}$ and $R^{12}$ at each occurrence are independently H, F, Cl, a substituted or an unsubstituted alkyl, alkenyl, or alkynyl group. In other embodiments, the compound of Formula VI is 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or a mixture of any two or more such compounds.

In some embodiments, the electrode stabilizing additive is a carbonate selected from ethylene carbonate, propylene carbonate, diethyl carbonate, dimethyl carbonate, ethyl methyl carbonate, or a mixture of two or more such materials. The concentration of the carbonate may be from about 0.001 wt % to about 50 wt %.

In other embodiments, the electrode stabilizing additive is an anion receptor capable of reducing the interfacial impedance of the cell. In such other embodiments, the anion receptor is a borane, a boronate, a borinate or a borate. For example, the anion receptor may include, but is not limited to tri(propyl)borate, tris(1,1,1,3,3,3-hexafluoro-propan-2-yl)borate, tris(1,1,1,3,3,3-hexafluoro-2-phenyl-propan-2-yl)borate, tris(1,1,1,3,3,3-hexafluoro-2-(trifluoromethyl)propan-2-yl)borate, triphenyl borate, tris(4-fluorophenyl)borate, tris(2,4-difluorophenyl)borate, tris(2,3,5,6-tetrafluorophenyl)borate, tris(pentafluorophenyl)borate, tris(3-(trifluoromethyl)phenyl)borate, tris(3,5-bis(trifluoromethyl)phenyl)borate, tris(pentafluorophenyl)borane, or a mixture of any two or more such materials. Further suitable additives include 2-(2,4-difluorophenyl)-4-fluoro-1,3,2-benzodioxaborole, 2-(3-trifluoromethyl phenyl)-4-fluoro-1,3,2-benzodioxaborole, 2,5-bis(trifluoromethyl)phenyl-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl phenyl)-tetrafluoro-1,3,2-benzodioxaborole, 2,5-bis(trifluoromethyl phenyl)-tetrafluoro-1,3,2-benzodioxaborole, 2-phenyl-4,4,5,5-tetra(trifluoromethyl)-1,3,2-benzodioxaborolane, 2-(3,5-difluorophenyl-4,4,5,5-tetrakis(trifluoromethyl)-1,3,2-dioxaborolane, 2-(3,5-difluorophenyl-4,4,5,5-tetrakis(trifluoromethyl)-1,3,2-dioxaborolane, 2-pentafluorophenyl-4,4,5,5-tetrakis(trifluoromethyl)-1,3,2-dioxaborolane, bis(1,1,1,3,3,3-hexafluoroisopropyl)phenyl-boronate, bis(1,1,1,3,3,3-hexafluoroisopropyl)-3,5-difluorophenylboronate, bis(1,1,1,3,3,3-hexafluoroisopropyl)pentafluorophenylboronate, or a mixture of any two or more such compounds. In other embodiments, the anion receptor is present at a concentration of about 0.001 to about 10 wt %.

In yet other embodiments, the lithium salt is not $LiB(C_2O_4)_2$, $LiBF_2(C_2O_4)$, $Li[PF_2(C_2O_4)_2]$ or $Li[PF_4(C_2O_4)]_5$ and the electrode stabilizing additive is $LiB(C_2O_4)_2$, $LiBF_2(C_2O_4)$, $Li[PF_2(C_2O_4)_2]$, $Li[PF_4(C_2O_4)]$, or a mixture of any two or more such compounds. In such other embodiments, the concentration of the additive is from about 0.001 wt % to about 10 wt %.

In some embodiments, the lithium salt is not $Li_2B_{12}X_{12-p}H_p$ or $Li_2B_{10}Cl_{10-y}H_y$ and the electrode stabilizing additive is $LiB(C_2O_4)_2$, $LiBF_2(C_2O_4)$, $Li[PF_2(C_2O_4)_2]$, $Li[PF_4(C_2O_4)]$, or a mixture of any two or more such compounds. In such embodiments, X is OH, F, Cl, or Br; p is an integer from zero to twelve; and y is an integer from zero to ten.

In some embodiments, the electrolyte is a gel electrolyte including a liquid electrolyte embodied herein; a crosslinking agent; a monofunctional monomeric compound; a radical reaction initiator. Suitable crosslinking agents may be a compound of Formula IX:

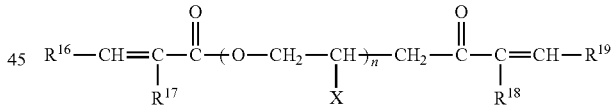

IX where, $R^{16}$, $R^{17}$, $R^{18}$, and $R^{19}$ are independently hydrogen, a substituted or unsubstituted alkyl group having from 1 to 12 carbon atoms, or a substituted or unsubstituted alkenyl group having from 2 to 12 carbon atoms; X is hydrogen, methyl, or ethyl; and n is an integer from 1 to 15. Suitable monofunctional monomeric compounds may be a compound of Formula X:

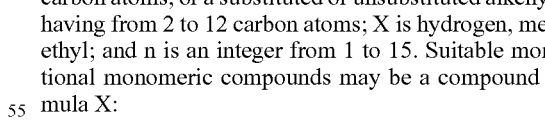

X where, $R^{20}$ is an alkyl group having from 1 to 12 carbon atoms; $R^{21}$ and $R^{22}$ are independently a hydrogen, a substituted or unsubstituted alkyl group having from 1 to 12 carbon atoms, or a substituted or unsubstituted alkenyl group having from 2 to 12 carbon atoms; X is hydrogen, methyl, or ethyl; and n is an integer from 1 to 20.

In some embodiments, the poly(ethyleneoxide) siloxane is present from about 5 wt % to about 95 wt %, where the wt % is calculated on the total weight of the at least one poly (ethyleneoxide) siloxane, the at least one crosslinking agent, the at least one monofunctional monomeric compound, the at least one salt, and the at least one radical reaction initiator. In other embodiments, the crosslinking agent is present from about 5 wt % to about 60 wt %, where the wt % is calculated on the total weight of the at least one poly(ethyleneoxide) siloxane, the at least one crosslinking agent, the at least one monofunctional monomeric compound, the at least one salt, and the at least one radical reaction initiator. In yet other embodiments, the monofunctional monomeric compound is present from about 10 wt % to about 50 wt %, where the wt % is calculated on the total weight of the at least one poly (ethyleneoxide) siloxane, the at least one crosslinking agent, the at least one monofunctional monomeric compound, the at least one salt, and the at least one radical reaction initiator.

In some embodiments, the at least one radical reaction initiator is a thermal initiator, a photoinitiator, or a mixture of initiators, where the thermal initiator is an azo compound, a peroxide compound, bismaleimide, or a mixture of any two or more such thermal initiators; and the photoinitiator is 1-hydroxyl-phenyl-ketone, benzophenone, 2-hydroxyl-2-methyl-1-phenyl-propanone, 2-hydroxyl-1-[4-(2-hydroxy)phenyl]-2-methyl-1-propanone, methylbenzoylformate, oxy-phenyl-acetic acid 2-[2-oxo-2-phenyl-acetoxy-ethoxy]-ethyl ester, oxy-phenyl-acetic 2-[2-hydroxy-ethoxy]-ethyl ester, α,α-dimethoxy-α-phenylacetophenone, 2-benzyl-2-(dimethylamino)-1-[4-(4-morpholinyl)phenyl]-1-propanone, diphenyl(2,4,6-trimethylthio)phenyl)-phosphine oxide, phosphine oxide, phenyl bis(2,4,6-trimethyl benzoyl), bis(eta 5-2,4-cyclopentadien-1-yl)bis[2,6-difluoro-3-(1H-pyrrol-1-yl)phenyl]titanium, iodonium (4-methylphenyl)-[4-(2-methylpropyl)phenyl]-hexafluorophosphate, or a mixture of any two or more such photoinitiators.

In some embodiments, the negative electrode is lithium. In other embodiments, the air-positive electrode includes an additive to assist the reduction of oxygen. Exemplary additives include, but not limited to, cobalt phthalocyanine, $MnOOH$, $MnO_x$, $CoO_x$, Pt, $Pt_{1-x}Ru_x$, $La_{1-x}Ca_xCoO_3$, $CO_3O_4$, $NiCo_2O_4$, $Pb_2Ru_2Pb_{1-x}O_{1-y}$, $Na_xPt_3O_4$, where $0 \le x \le 1$ and $0 \le y \le 1$.

DETAILED DESCRIPTION

Non-aqueous electrolytes are provided for use in lithium-based batteries. For example, the electrolytes may be used in lithium-ion batteries or in lithium-air batteries. In particular, the electrolytes may be used in batteries where oxidation of traditional electrolytes is of concern. Such non-aqueous electrolytes include a polyethylene oxide (PEO)-based solvent/liquid phase for lithium-ion and oxygen transport and a lithium salt. The PEO-based solvent includes a solvent with at least one end of a PEO chain terminated by a silicon-containing group (siloxanes), and/or a phosphorous-containing group (phosphates). In some cases, PEO-based siloxanes have one or more PEO groups attached to a silicon atom. In other cases, PEO-based phosphates have one or more PEO groups attached to a phosphorus atom. While in yet other cases, the PEO-based solvent may be a mixed siloxane and phosphate with at least one silicon atom and at least one phosphorus atom.

To facilitate their use in lithium batteries, the PEO siloxanes or phosphates are typically easily dissolve the lithium salt, and have the required viscosity to transport the lithium ions. Such viscosities are typically low viscosities.

While the non-aqueous electrolytes include many types of PEO-based solvents with PEO as side chain linked to a silicon or phosphorus atom, in some embodiments, the poly(ethyleneoxide) solvent is a compound of Formula Ia, Ib, Ic, Id, Ia. IIb, IIc, or a mixture of any two or more such materials:

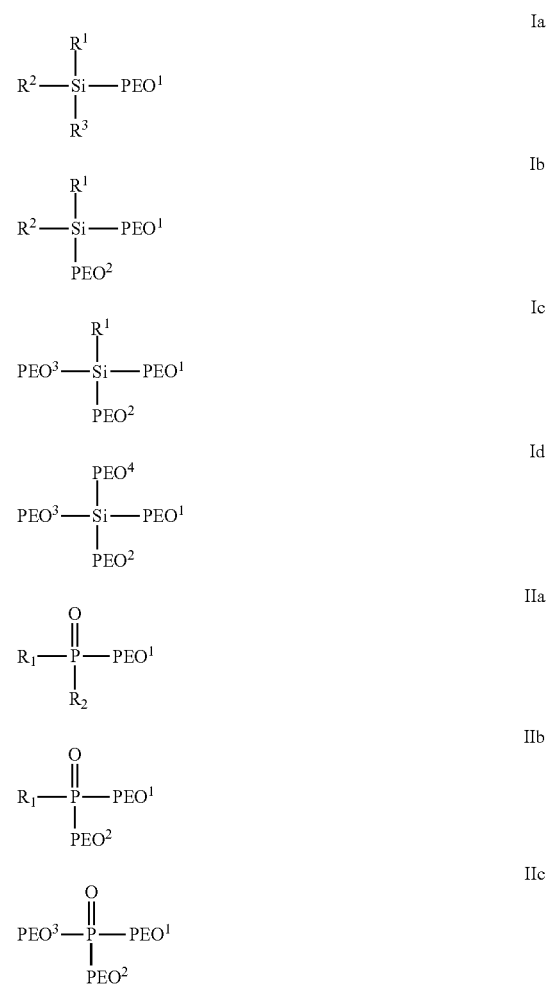

where $R^1$, $R^2$, and $R^3$ are independently hydrogen, a substituted or unsubstituted alkyl group having from 1 to 12 carbon atoms, a substituted or unsubstituted alkenyl group having from 2 to 12 carbon atoms, or a group of Formula IIIa, IIIb, IIIc, IIId, IVa, or IVb;

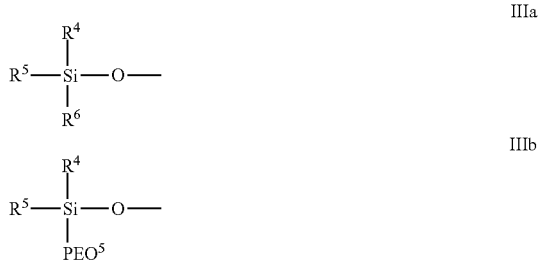

-continued

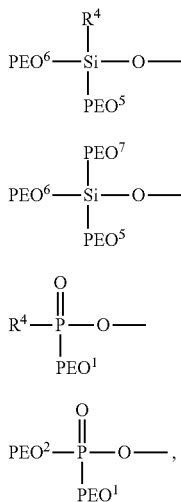

where $R^4$, $R^5$, and $R^6$ are independently hydrogen, a substituted or unsubstituted alkyl group having from 1 to 12 carbon atoms, or a substituted or unsubstituted alkenyl group having from 2 to 12 carbon atoms; and $PEO^1$, $PEO^2$, $PEO^3$, $PEO^4$, $PEO^5$, $PEO^6$, and $PEO^7$ are independently a poly(ethyleneoxide) group; with the provision that when the poly(ethyleneoxide) siloxane is a compound of Formula Ia and $R^1$ is a group of Formula IIIa or IIIb, then at least one of $R^2$, $R^3$, $R^4$, $R^5$, and $R^6$ is other than alkyl; and where the electrolyte is a non-aqueous electrolyte.

In some embodiments, the poly(ethyleneoxide) solvent is a compound of Formula Ib, Ic, Id, or a mixture of any two or more such materials.

$PEO^1$, $PEO^2$, $PEO^3$, $PEO^4$, $PEO^5$, $PEO^6$ and $PEO^7$ are independently represented by Formula Va or Vb;

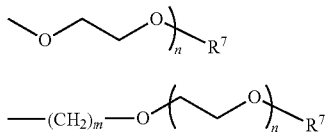

where $R^7$ is a hydrogen, a substituted or unsubstituted alkyl group having from 1 to 12 carbon atoms, a substituted or unsubstituted alkenyl group having from 2 to 12 carbon atoms, or a group of Formula VI;

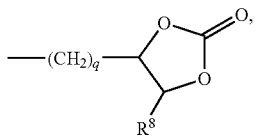

where $R^8$ is hydrogen, a substituted or unsubstituted alkyl group having from 1 to 12 carbon atoms, or a substituted or unsubstituted alkenyl group having from 2 to 12 carbon atoms; m represents an integer from 1 to 8, n represents an integer from 0 to 20, and q represents an integer from 0 to 8.

The PEO-based solvents may also include a compound of Formula IIa, IIb, IIc, or a mixture of any two or more such materials. The PEO-based solvent may be a mixture of any two or more of the compounds of Formula IIa, IIb, or IIc, with any two or more of the compounds of Formula Ia, Ib, Ic, Id. In some embodiments, at least one of $R^1$, $R^2$, or $R^3$ is a group of Formula IIIa, IIIb, IIIc, or IIId.

In addition to the PE-based solvents, the non-aqueous electrolytes may also include a siloxanyl carbonate co-solvent. For example, the co-solvent may be 1-[1-trimethylsiloxanyl-ethyl]ethylene carbonate (1NMC), or similar compounds that may have other alkyl groups instead of methyl groups or longer or shorter alkyl tethers between the siloxygroup and the cyclic carbonate. 1 NMC may be structurally represented as:

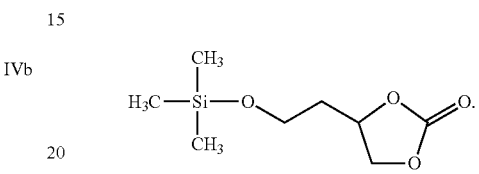

In some other embodiments, the co-solvent may be present in the non-aqueous electrolyte is from about 0.1 wt % to about 80 wt %.

The identity of the lithium salt used in the non-aqueous electrolytes is not particularly limited. The salt will preferably dissolve, at least partially, in the siloxane or phosphate solvent, and it should serve as an electrolyte for a lithium-air battery. Suitable lithium salts include, but are not limited to $LiCF_3CO_2$, $LiC_2F_5CO_2$, $LiClO_4$, $LiBF_4$, $LiAsF_6$, $LiPF_6$, $LiPF_2(C_2O_4)_2$, $LiPF_4C_2O_4$, $LiCF_3SO_3$, $LiN(CF_3SO_2)_2$, $LiC(CF_3SO_2)_3$, $LiN(SO_2C_2F_5)_2$, lithium alkyl fluorophosphates, lithium bis(oxalato) borate (LiBOB; $LiB(C_2O_4)_2$), $LiBF_2C_2O_4$, $Li_2B_{12}X_{12-p}H_p$, $Li_2B_{10}Cl_{10-y}H_y$, or mixtures of any two or more such materials. In such formulas, X may be OH, F, Cl, Br, or I; p is an integer from zero to twelve; and y is an integer from zero to ten.

Lithium (chelato)borates such as $Li[B(C_2O_4)_2]$ and $Li(C_2O_4)BF_2$, or lithium (chelato)phosphates such as $LiPF_2(C_2O_4)_2$ and $LiPF_4C_2O_4$ may also be used as either the lithium salt, or as an electrode stabilizing additive. Thus, in some embodiments, the lithium salt may be other than $Li[B(C_2O_4)_2]$, $Li[BF_2(C_2O_4)]_5$ $LiPF_4C_2O_4$ or $Li[PF_2(C_2O_4)_2]$; and the electrolyte may include, as an electrode stabilizing additive, $Li[B(C_2O_4)_2]$, $Li[BF_2(C_2O_4)]$, $Li[PF_2(C_2O_4)_2]$, $LiPF_4C_2O_4$ or a mixture of any two or more such materials. Such materials may be present in the non-aqueous electrolyte from about 0.001 wt % to about 10 wt %.

Like the lithium (chelato)borates, the lithium salt may be other than $Li_2B_{12}X_{12-p}H_p$ or $Li_2B_{10}Cl_{10-y}H_y$, and the electrolyte may include, as a electrolyte additive, $Li_2B_{12}X_{12-p}H_p$, $Li_2B_{10}Cl_{10-y}H_y$, or a mixture of two or more such materials. As above, X may be OH, F, Cl, Br, or I; p is an integer from zero to twelve; and y is an integer from zero to ten. The electrolyte additive may be present in the non-aqueous electrolyte from about 0.001 wt % to about 15 wt %, to aid in overcharge protection of lithium-air cells.

According to various embodiments, the molar ratio of the lithium salt in the PEO-based non-aqueous electrolyte is from about 0.01 M to about 1.5 M, from about 0.05 M to about 1.2 M, or from about 0.4 M to about 1.0 M. Without being bound by theory, if the concentration of the lithium salt is smaller than 0.01 M, the ionic conductivity of the resulting non-aqueous electrolyte is decreased due to an inadequate number of carrier ions are in the gel electrolyte. Hence, the above molar ratios are provided.

The non-aqueous electrolytes may also include one or more electrolyte additives, including those electrolyte additives that protect the electrodes from degradation. For example, co-pending U.S. patent application Ser. No. 10/857, 365, includes such electrode additives. The non-aqueous electrolytes may also include one or more stabilizing additives that can be oxidized or polymerized on the surface of the positive electrode to form a passivation film on the surface of the positive electrode. In some other embodiments, the non-aqueous electrolytes of the present invention further include mixtures electrode stabilizing additives. The electrode stabilizing additives are typically present at a concentration of about 0.001 to about 10 wt %.

Electrolyte additives that suitable for use in the non-aqueous electrolytes include, but are not limited to, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o-terphenyl, N-methylpyrrole, naphthalene, 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or a mixture of any two or more such materials.

The electrode stabilizing additive may alternatively be a substituted or unsubstituted spirocyclic hydrocarbon containing at least one oxygen atom and at least one alkenyl or alkynyl group. Such electrode stabilizing additives may include compounds of Formula VII:

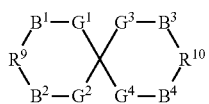

VII where $B^1$, $B^2$, $B^3$, and $B^4$ are independently O or $CR^{11}R^{12}$; provided that $B^1$ is not O when $G^1$ is O, $B^2$ is not O when $G^2$ is O, $B^3$ is not O when $G^3$ is O, and $B^4$ is not O when $G^4$ is O; $G^1$, $G^2$, $G^3$, and $G^4$ are independently O or $CR^{11}R^{12}$; provided that $G^1$ is not O when $B^1$ is O, $G^2$ is not O when $B^2$ is O, $G^3$ is not O when $B^3$ is O, and $G^4$ is not O when $B^4$ is O. In such embodiments, $R^9$ and $R^{10}$ are independently a substituted or unsubstituted divalent alkenyl or alkynyl group, and $R^{11}$ and $R^{12}$ at each occurrence are independently H, F, Cl, a substituted or an unsubstituted alkyl, alkenyl, or alkynyl group. In other embodiments, the compound of Formula VII is 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or a mixture of any two or more such compounds.

The electrode stabilizing additive may also be an anion receptor. In some embodiments, the anion receptor is a Lewis acid, while in other embodiments, the anion receptor is a borane, a boronate, a borate, a borole, or a mixture of any two or more such boron compounds. For example, the anion receptor may be a compound of Formula VIII.

(VIII)

where, $R^{13}$, $R^{14}$, and $R^{15}$ are independently halogen, alkyl, aryl, halogen-substituted alkyl, halogen-substituted aryl, or $OR^{23}$; or any two $R^{13}$, $R^{14}$, $R^{15}$, and $R^{23}$, together with the atoms to which they are attached, form a heterocyclic ring having 5-9 members. $R^{23}$, at each occurrence, is independently alkyl, aryl, halogen-substituted alkyl, or halogen-substituted aryl. In some such embodiments, $R^{13}$, $R^{14}$, and $R^{15}$ are independently halogen, alkyl, aryl, halogen-substituted alkyl, or halogen-substituted aryl; or any two of $R^{13}$, $R^{14}$, and $R^{15}$, together with the boron to which they are attached, form a heterocyclic ring having 5-9 members.

In some embodiments, the anion receptors include, but not limited to, tri(propyl)borate, tris(1,1,1,3,3,3-hexafluoro-propan-2-yl)borate, tris(1,1,1,3,3,3-hexafluoro-2-phenyl-propan-2-yl)borate, tris(1,1,1,3,3,3-hexafluoro-2-(trifluoromethyl)propan-2-yl)borate, triphenyl borate, tris(4-fluorophenyl)borate, tris(2,4-difluorophenyl)borate, tris(2,3,5,6-tetrafluorophenyl)borate, tris(pentafluorophenyl)borate, tris(3-(trifluoromethyl)phenyl)borate, tris(3,5-bis(trifluoromethyl)phenyl)borate, tris(pentafluorophenyl)borane, or a mixture of any two or more such compounds. Further suitable additives include 2-(2,4-difluorophenyl)-4-fluoro-1,3,2-benzodioxaborole, 2-(3-trifluoromethyll phenyl)-4-fluoro-1,3,2-benzodioxaborole, 2,5-bis(trifluoromethyl)phenyl-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl phenyl)-tetrafluoro-1,3,2-benzodioxaborole, 2,5-bis(trifluoromethyl phenyl)-tetrafluoro-1,3,2-benzodioxaborole, 2-phenyl-4,4,5,5-tetra(trifluoromethyl)-1,3,2-benzodioxaborolane, 2-(3,5-difluorophenyl-4,4,5,5-tetrakis(trifluoromethyl)-1,3,2-dioxaborolane, 2-(3,5-difluorophenyl-4,4,5,5-tetrakis (trifluoromethyl)-1,3,2-dioxaborolane, 2-pentafluorophenyl-4,4,5,5-tetrakis(trifluoromethyl)-1,3,2-dioxaborolane, bis(1,1,1,3,3,3-hexafluoroisopropyl)phenyl-boronate, bis(1,1,1,3,3,3-hexafluoroisopropyl)-3,5-difluorophenylboronate, bis(1,1,1,3,3,3-hexafluoroisopropyl)pentafluorophenylboronate, or a mixture of any two or more such compounds.

In some embodiments, each anion receptor is present at a concentration of about 0.001 to about 10 wt %.

In some embodiments, the inventive electrolyte is a gel electrolyte including at least one PEO-based solvent; at least one lithium salt; at least one crosslinking agent; at least one monofunctional monomeric compound; and at least one radical reaction initiator. In some embodiments, the gel electrolyte can also include other electrode stabilization additives and other electrolyte additives.

In some embodiments, the electrolyte is a gel electrolyte including a non-aqueous electrolyte; a crosslinking agent; a monofunctional monomeric compound; a radical reaction initiator. Suitable crosslinking agents may be a compound of Formula IX:

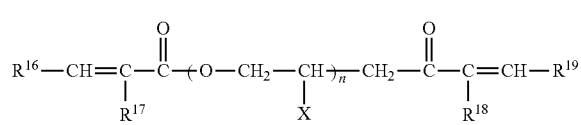

(IX)

where, $R^{16}$, $R^{17}$, $R^{18}$, and $R^{19}$ are independently hydrogen, a substituted or unsubstituted alkyl group having from 1 to 12 carbon atoms, or a substituted or unsubstituted alkenyl group having from 2 to 12 carbon atoms; X is hydrogen, methyl, or ethyl; and n is an integer from 1 to 15.

In some embodiment, Monofunctional monomeric compounds may be used for the control of the crosslinking density of the gel electrolyte. Suitable monofunctional monomeric compounds include those of Formula X:

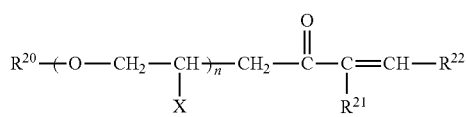

(X)

where, $R^{20}$ is an alkyl group having from 1 to 12 carbon atoms; $R^{21}$ and $R^{22}$ are independently a hydrogen, a substituted or unsubstituted alkyl group having from 1 to 12 carbon atoms, or a substituted or unsubstituted alkenyl group having from 2 to 12 carbon atoms; X is hydrogen, methyl, or ethyl; and n is an integer from 1 to 20.

Crosslinking agents and monofunctional monomeric compounds provide a physical framework, or gel, after crosslinking to host the liquid phase. Variation of the amount of the crosslinking agent and monofunctional monomeric compound in the gel may impact the conductivity of the gel electrolyte, due to changes in viscosity. Lower viscosity gels are prepared with higher concentrations of monofunctional monomeric compound, as compared to the concentration of monofunctional monomeric compound used for higher viscosity gels. Without being bound by theory, higher viscosity gels may be expected to have lower electrochemical conductivity, while lower viscosity gels may be expected to have higher electrochemical conductivity. However, other electrochemical properties of the gel electrolyte, or an electrochemical cell prepared with the gel electrolyte, such as oxidation potential and reduction potential, are not expected to be impacted.

Polymerization of crosslinking agents and monofunctional monomeric compounds are known to those of skill in the art. For example, these monomeric species may be polymerized by thermal and photo initiation. Representative thermal initiators include, but are not limited to, an azo compound, a peroxide compound, bismaleimide, or a mixture of any two or more such thermal initiators. One example of an azo compound is azoisobutyronitrile. One example of a peroxide compound is benzoylperoxide. Representative photoinitiators include, but are not limited to, 1-hydroxyl-phenyl-ketone, benzophenone, 2-hydroxyl-2-methyl-1-phenyl-propanone, 2-hydroxyl-1-[4-(2-hydroxy)phenyl]-2-methyl-1-propanone, methylbenzoylformate, oxy-phenyl-acetic acid 2-[2-oxo-2-phenyl-acetoxy-ethoxy]-ethyl ester, oxy-phenyl-acetic 2-[2-hydroxy-ethoxy]-ethyl ester, α,α-dimethoxy-α-phenylacetophenone, 2-benzyl-2-(dimethylamino)-1-[4-(4-morpholinyl)phenyl]-1-propanone, diphenyl(2,4,6-trimethylthio)phenyl)-phosphine oxide, phosphine oxide, phenyl bis(2,4,6-trimethyl benzoyl), bis(eta 5-2,4-cyclopentadien-1-yl)bis[2,6-difluoro-3-(1H-pyrrol-1-yl)phenyl]titanium, iodonium (4-methylphenyl)-[4-(2-methylpropyl)phenyl]-hexafluorophosphate, or a mixture of two or more such photoinitiators. In some instances the photoinitiator is a UV initiator.

Lithium-air electrochemical cells are also provided. Such cell include a non-aqueous electrolyte, a lithium negative electrode, and an air-positive electrode. Suitable non-aqueous electrolytes include those described herein. The air-positive electrode may also include additives to assist in the reduction of the oxygen during a charging cycle of the cell. As such, the lithium-air cells may be rechargeable. Exemplary additives include materials such as, but not limited to, cobalt phthalocyanine, MnOOH, $MnO_x$, $CoO_x$, Pt, $Pt_{1-x}Ru_x$, $La_{1-x}Ca_xCoO_3$, $CO_3O_4$, $NiCo_2O_4$, $Pb_2Ru_2Pb_{1-x}O_{1-y}$, $Na_xPt_3O_4$, where $0 \le x \le 1$, $0 \le y \le 1$, and at non-stoichiometric ratios of x and y. For example, x may be greater than zero and less than or equal to one, or x may be greater than or equal to zero, but less than one. Likewise, y may vary as such.

One skilled in the art will readily realize that all ranges and ratios discussed can and do necessarily also describe all subranges and subratios therein for all purposes and that all such subranges and subratios also form part and parcel of this invention. Any listed range or ratio can be easily recognized as sufficiently describing and enabling the same range or ratio being broken down into at least equal halves, thirds, quarters, fifths, tenths, etc. As a non-limiting example, each range or ratio discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

For the purposes of this disclosure and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

MCMB is an abbreviation for mesocarbon microbeads.

SEI is an abbreviation for solid electrolyte interface. An SEI is defined herein as organic-inorganic composite thin film deposited on the surface of electrode materials.

As used herein, the term "gelled electrolyte" refers to the incorporation of polymerizable materials that will form a gel, thus providing viscosity and body to the electrolyte, while still allowing for ion transport within the electrolyte.

Alkyl groups include straight chain and branched alkyl groups having from 1 to 12 carbon atoms or, in some embodiments, from 1 to 8, 1 to 6, or 1 to 4 carbon atoms. Alkyl groups further include cycloalkyl groups as defined below. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Cycloalkyl groups further include mono-, bicyclic and polycyclic ring systems. Substituted cycloalkyl groups may be substituted one or more times with non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4- 2,5- or 2,6-disubstituted cyclohexyl groups, which may be substituted with substituents such as those listed above.

Alkenyl groups include straight and branched chain and cycloalkyl groups as defined above, except that at least one double bond exists between two carbon atoms. Thus, alkenyl groups have from 2 to about 12 carbon atoms in some embodiments, from 2 to 10 carbon atoms in other embodiments, and from 2 to 8 carbon atoms in other embodiments. Examples include, but are not limited to vinyl, allyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl, among others. Representative substituted alkenyl groups may be mono-substituted or substituted more than once, such as, but not limited to, mono-, di- or tri-substituted with substituents such as those listed above.

In general, "substituted" refers to an alkyl or alkenyl group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

The processes and products illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

While exemplary embodiments are described herein, it should be understood that changes and modifications can be made therein in accordance with ordinary skill in the art without departing from the invention in its broader aspects as defined in the following claims.

What is claimed is:

1. A lithium-air cell comprising:
   a negative electrode;
   an air positive electrode; and
   a non-aqueous electrolyte comprising:
   a lithium salt; and
   a poly(ethyleneoxide) solvent that is a compound of Formula IIa, IIb, IIc, or a mixture of any two or more thereof:

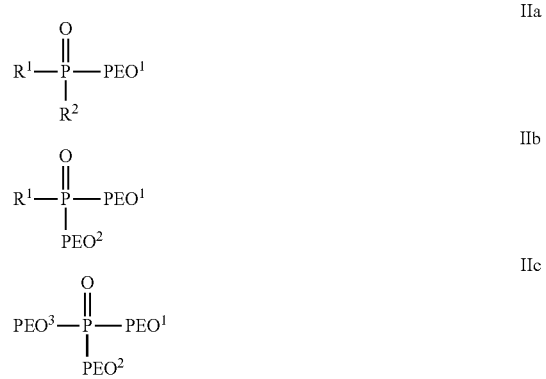

$R^1$ and $R^2$ are independently H, a substituted or unsubstituted alkyl group having from 1 to 12 carbon atoms, a substituted or unsubstituted alkenyl group having from 2 to 12 carbon atoms, or a group of Formula IIIa, IIIb, IIIc, IIId, IVa, or IVb;

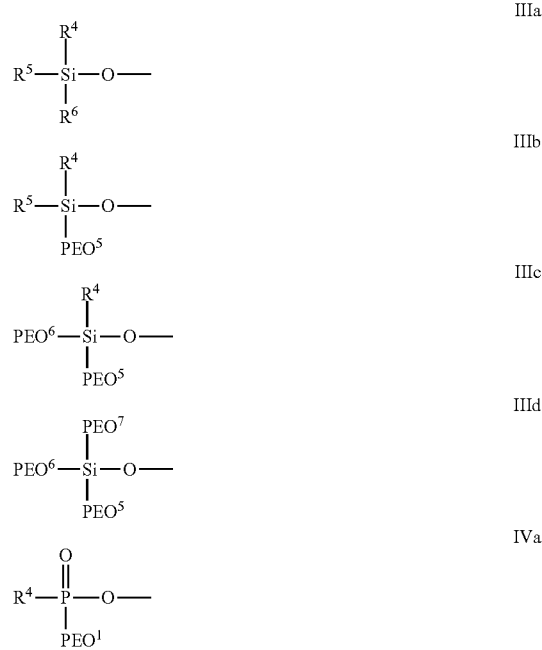

-continued

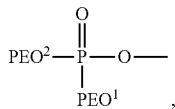
IVb $R^4$, $R^5$, and $R^6$ are independently H, a substituted or unsubstituted alkyl group having from 1 to 12 carbon atoms, or a substituted or unsubstituted alkenyl group having from 2 to 12 carbon atoms; and $PEO^1$, $PEO^2$, $PEO^3$, $PEO^5$, $PEO^6$, and $PEO^7$ are independently a poly(ethyleneoxide) group.

2. The lithium-air cell of claim 1, wherein $PEO^1$, $PEO^2$, $PEO^3$, and $PEO^4$ are independently represented by Formula Va or Vb;

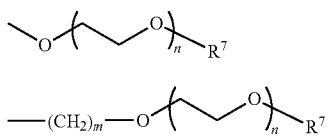

wherein;

$R^7$ is H, a substituted or unsubstituted alkyl group having from 1 to 12 carbon atoms, a substituted or unsubstituted alkenyl group having from 2 to 12 carbon atoms, or a group of Formula VI,

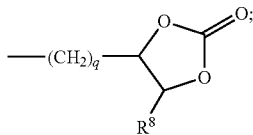
VI $R^8$ is H, a substituted or unsubstituted alkyl group having from 1 to 12 carbon atoms, or a substituted or unsubstituted alkenyl group having from 2 to 12 carbon atoms;

m represents an integer from 1 to 8, n represents an integer from 0 to 20, and q represents an integer from 0 to 8.

3. The lithium-air cell of claim 1, wherein at least one of $R^1$ or $R^2$ is a group of Formula IIa, IIb, IIc, or IId.

4. The lithium-air cell of claim 1, further comprising a siloxanyl carbonate co-solvent.

5. The lithium-air cell of claim 4, wherein the co-solvent is 1-[1-trimethylsiloxanyl-ethyl]ethylene carbonate.

6. The lithium-air cell of claim 1, wherein the electrolyte is not a gelled electrolyte.

7. The lithium-air cell of claim 1, wherein the poly(ethyleneoxide) solvent is present from about 5 wt % to about 95 wt %, wherein the wt % is calculated on the total weight of the poly(ethyleneoxide) solvent, the salt, and the electrode stabilizing additive.

8. The lithium-air cell of claim 1, wherein the lithium salt is electrochemically and chemically stable in the presence of oxygen.

9. The lithium-air cell of claim 1, wherein:

the lithium salt is selected from the group consisting of $LiCF_3CO_2$, $LiC_2F_5CO_2$, $LiClO4$, $LiBF_4$, $LiAsF_6$, $LiPF_6$, $LiPF_2(C_2O_4)_2$, $LiPF_4C_2O_4$, $LiCF_3SO_3$, $LiN(CF_3SO_2)_2$, $LiC(CF_3SO_2)_3$, $LiN(SO_2C_2F_5)_2)$, lithium alkyl fluorophosphates, $Li(C_2O_4)_2$, $LiBF_2C_2O_4$, $Li_2B_{12}X_{12-p}H_p$, $Li_2B_{10}X_{10-y}H_y$, and mixtures of any two or more thereof;

X is selected from the group consisting of OH, F, Cl, and Br;

p=0, 1, 2, 3, 4, 5, 6, 7, 8, 9, 10, 11, or 12; and y=0, 1, 2, 3, 4, 5, 6, 7, 8, 9, or 10.

10. The lithium-air cell of claim 1, wherein the concentration of the lithium salt is from about 0.01 M to about 2.0 M.

11. The lithium-air cell of claim 1 further comprising an electrode stabilizing additive that can be oxidized or polymerized on the surface of a positive electrode, or can be reduced or polymerized on the surface of a negative electrode.

12. The lithium-air cell of claim 11, wherein the concentration of the electrode stabilizing additive is from about 0.001 wt % to about 10 wt %.

13. The lithium-air cell of claim 1, further comprising a crosslinking agent, a monofunctional monomeric compound, and a radical reaction initiator.

14. The lithium-air cell of claim 1, wherein the negative electrode is lithium.

15. The lithium-air cell of claim 1, wherein the air-positive electrode further comprises an additive to assist the reduction of oxygen.

16. The lithium-air cell of claim 15, wherein the additive is selected from cobalt phthalocyanine, MnOOH, $MnO_x$, $CoO_x$, Pt, $Pt_{1-x}Ru_x$, $La_{1-x}Ca_xCoO_3$, $Co_3O_4$, $NiCo_2O_4$, $Pb_2Ru_2Pb_{1-x}O_{1-y}$, $Na_xPt_3O_4$, or a mixture of any two or more thereof, and $0 \leq x \leq 1$ and $0 \leq y \leq 1$.

* * * * *